US012713176B2

(12) United States Patent
Nakamura et al.

(10) Patent No.: US 12,713,176 B2

(45) Date of Patent: Aug. 18, 2026

(54) LOUDSPEAKER

(71) Applicant: Panasonic Intellectual Property Management Co., Ltd., Osaka (JP)

(72) Inventors: Taishi Nakamura, Osaka (JP); Satoshi Itoh, Osaka (JP); Ryo Watanabe, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 225 days.

(21) Appl. No.: 18/367,092

(22) Filed: Sep. 12, 2023

(65) Prior Publication Data

US 2023/0421948 A1 Dec. 28, 2023

Related U.S. Application Data

(63) Continuation of application No. PCT/JP2022/003395, filed on Jan. 28, 2022.

(30) Foreign Application Priority Data

Mar. 19, 2021 (JP) ................................ 2021-046585

(51) Int. Cl.
*H04R 1/24* (2006.01)
*H04R 1/28* (2006.01)
(Continued)

(52) U.S. Cl.
CPC ............ *H04R 1/24* (2013.01); *H04R 1/2803* (2013.01); *H04R 7/20* (2013.01); *H04R 9/025* (2013.01); *H04R 9/06* (2013.01)

(58) Field of Classification Search
CPC .......... H04R 1/24; H04R 1/2803; H04R 7/20; H04R 9/025; H04R 9/06; H04R 1/2873; H04R 9/022; H04R 9/063
See application file for complete search history.

(56) References Cited

U.S. PATENT DOCUMENTS 4,552,242 A * 11/1985 Kashiwabara .......... H04R 1/24 181/144
10,694,279 B1 * 6/2020 Danovi ................. H04R 1/323
(Continued)

FOREIGN PATENT DOCUMENTS

JP 3002891 U 7/1994
JP 09-018993 1/1997
(Continued)

OTHER PUBLICATIONS

Japan Office Action issued in Japan Patent Application No. 2021-46585, dated Nov. 26, 2024, together with English translation thereof.
(Continued)

*Primary Examiner* — Gerald Gauthier
(74) *Attorney, Agent, or Firm* — Greenblum & Bernstein, P.L.C.

(57) ABSTRACT

A loudspeaker includes: a first loudspeaker unit that includes a first magnetic circuit and a first cone; and a second loudspeaker unit that is disposed on a sound-emitting side of the first loudspeaker unit, and includes a second magnetic circuit and a second cone. The second loudspeaker unit includes a support component that: is fixed to the first magnetic circuit; supports therein the second magnetic circuit; is approximately cylindrical; and includes an end surface to which an entirety of an outer-circumferential portion of the second cone is connected.

7 Claims, 4 Drawing Sheets

(51) Int. Cl.

| | |
|---|---|
| ***H04R 7/20*** | (2006.01) |
| ***H04R 9/02*** | (2006.01) |
| ***H04R 9/06*** | (2006.01) |

(56) References Cited

U.S. PATENT DOCUMENTS

| | | | | |
|---|---|---|---|---|
| 2004/0047478 | A1* | 3/2004 | Combest | H04R 1/24 381/182 |
| 2005/0271236 | A1* | 12/2005 | Kobayashi | H04R 31/006 381/396 |
| 2006/0023903 | A1* | 2/2006 | Hayashi | H04R 1/24 381/182 |
| 2006/0285705 | A1* | 12/2006 | Kong | H04R 1/24 381/182 |
| 2015/0139478 | A1* | 5/2015 | Hyde | H04R 9/045 381/401 |
| 2017/0347184 | A1 | 11/2017 | Oshima et al. | |

FOREIGN PATENT DOCUMENTS

| | | | |
|---|---|---|---|
| JP | 11-285091 | | 10/1999 |
| JP | 2003-299193 | | 10/2003 |
| JP | 2005-033593 | | 2/2005 |
| JP | 4019493 | B2 * | 12/2007 |
| JP | 2008-109576 | | 5/2008 |
| JP | 2008-259243 | | 10/2008 |
| JP | 4435245 | | 1/2010 |
| JP | 2010-109945 | | 5/2010 |
| JP | 6353078 | | 6/2018 |

OTHER PUBLICATIONS

International Search Report issued in International Patent Application No. PCT/JP2022/003395, dated Mar. 8, 2022, along with an English translation thereof.

Office Action issued in Mexican Patent Application No. MX/a/2023/009702, dated Feb. 12, 2026, together with English translation thereof.

* cited by examiner

LOUDSPEAKER

CROSS REFERENCE TO RELATED APPLICATION(S)

This is a continuation application of PCT International Application No. PCT/JP2022/003395 filed on Jan. 28, 2022, designating the United States of America, which is based on and claims priority of Japanese Patent Application No. 2021-046585 filed on Mar. 19, 2021.

FIELD

The present disclosure relates to a loudspeaker.

BACKGROUND

Conventionally, there is a so-called coaxial loudspeaker in which a pair of loudspeaker units is disposed on the same axis. As a specific structure of such a loudspeaker, a structure that includes a support component that is fixed to a magnetic circuit provided in a loudspeaker on the rear, and that supports a magnetic circuit provided in a loudspeaker on the front has been proposed (see Patent Literature (PTL) 1, for example).

CITATION LIST

Patent Literature

PTL 1: Japanese Unexamined Patent Application Publication No. 2005-033593

SUMMARY

However, the loudspeaker described in the above-mentioned PTL 1 can be improved upon.

The present disclosure provides a loudspeaker that can improve upon the above related art.

A loudspeaker according to one aspect of the present disclosure includes: a first loudspeaker unit that includes a first magnetic circuit and a first cone; and a second loudspeaker unit that is disposed on a sound-emitting side of the first loudspeaker unit, and includes a second magnetic circuit and a second cone, wherein the second loudspeaker unit includes a support component that is fixed to the first magnetic circuit and supports therein the second magnetic circuit, the support component being approximately cylindrical and including an end surface to which an entirety of an outer-circumferential portion of the second cone is connected.

The loudspeaker according to one aspect of the present disclosure can improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment of a loudspeaker according to the present disclosure will be described with reference to the drawings. It should be noted that the following embodiment is merely an example for describing the present disclosure, and is not intended to limit the scope of the present disclosure. For example, the shapes, structures, materials, elements, relative positional relationships, connection states, numerical values, formulas, and details of respective steps of methods, the order of the steps, and so on, described in the following embodiment are mere examples, and may include details that are not included in the following descriptions. Furthermore, although there are cases where geometric expressions, such as "parallel" and "orthogonal", are used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality.

Furthermore, hereinafter, multiple aspects of the present disclosure may be comprehensively described as a single embodiment. Moreover, part of the contents in the description below are described as optional elements related to the present disclosure.

In recent years, there is a demand to reduce the weight of loudspeakers as there are cases where a loudspeaker is mounted in a mobile body, such as a vehicle, or in a portable device.

The present disclosure is conceived based on knowledge obtained as a result of repeated, diligent experimentation and research carried out by the inventors regarding the above-mentioned problem, and has an object to provide a coaxial loudspeaker for which weight can be reduced with a simple configuration.

The inventors provide a loudspeaker that includes: a first loudspeaker unit that includes a first magnetic circuit and a first cone; and a second loudspeaker unit that is disposed on a sound-emitting side of the first loudspeaker unit, and includes a second magnetic circuit and a second cone. The second loudspeaker unit includes a support component that: is fixed to the first magnetic circuit; supports therein the second magnetic circuit; is approximately cylindrical; and includes an end surface to which an entirety of an outer-circumferential portion of the second cone is connected.

Figure 1:
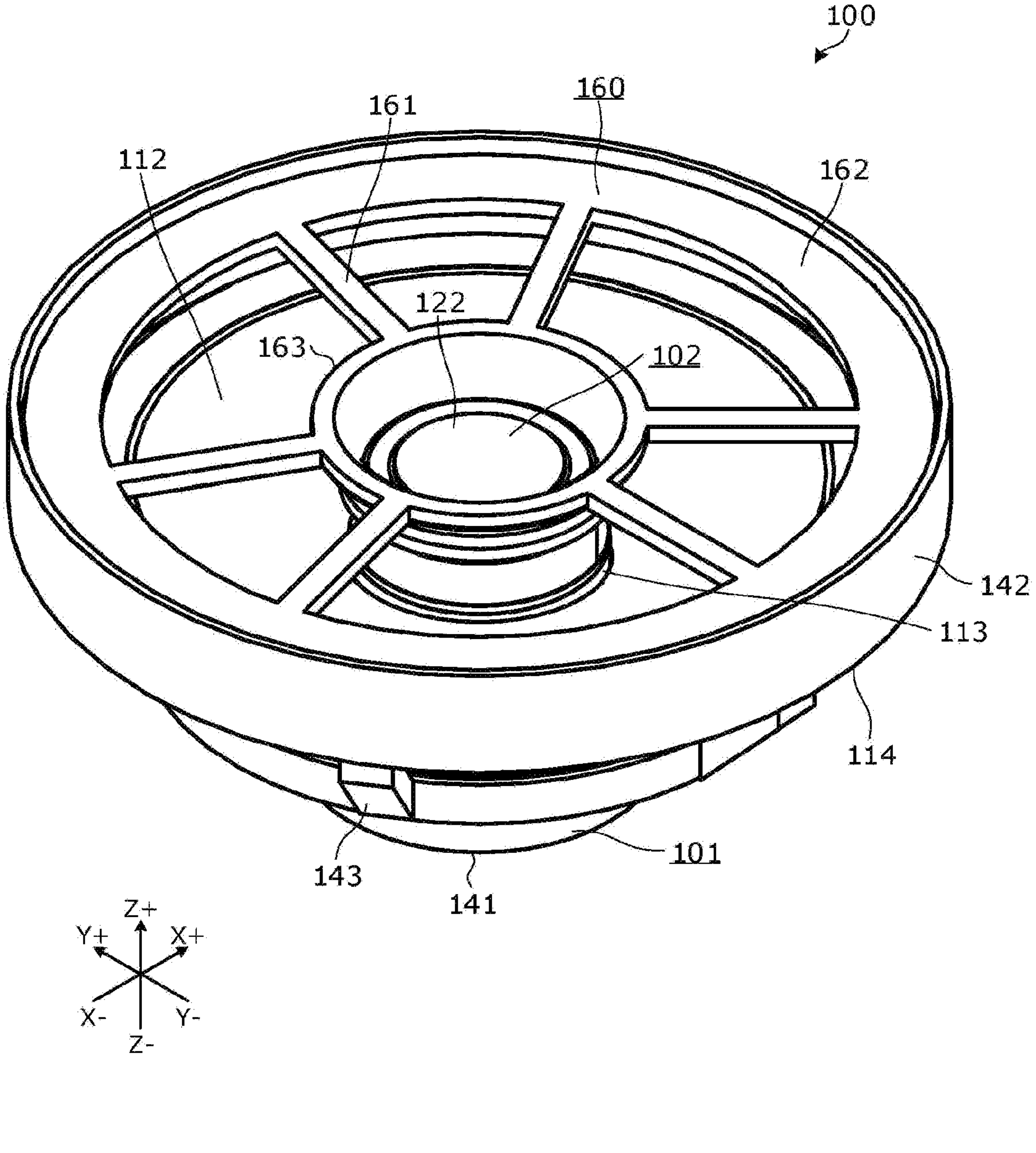
FIG. 1 is a perspective view of the external appearance of a loudspeaker according to an embodiment.
Figure 2:
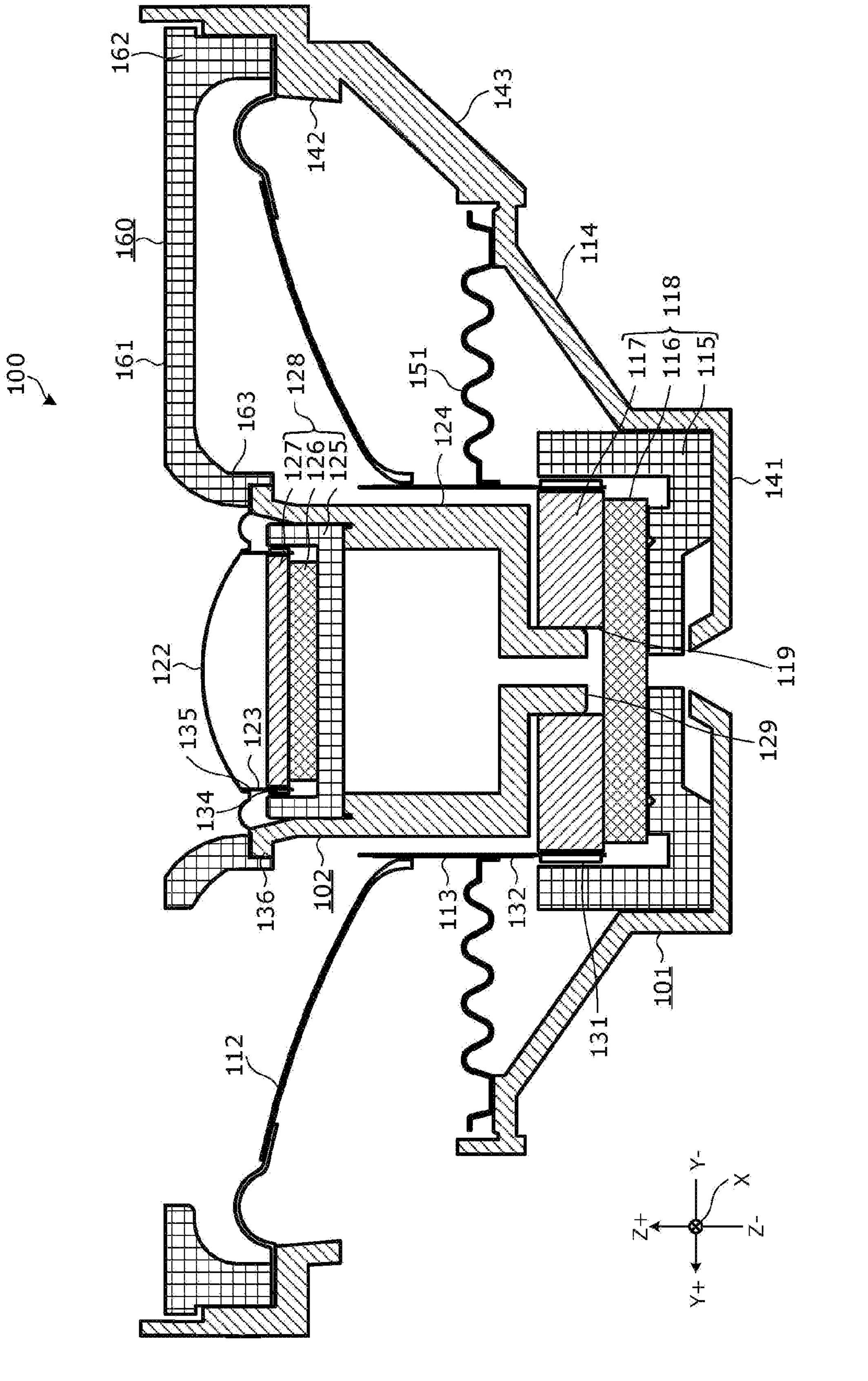
FIG. 2 is a cross-sectional view of the loudspeaker according to the embodiment.

FIG. 1 is a perspective view of the external appearance of the loudspeaker according to the embodiment. FIG. 2 is a cross-sectional view of the loudspeaker according to the embodiment. As shown in these figures, loudspeaker 100 is a loudspeaker in which two loudspeaker units are arranged in a row along the front-back direction (Z-axis direction in the figures), and includes first loudspeaker unit 101 and second loudspeaker unit 102.

First loudspeaker unit 101 is a loudspeaker that is larger than second loudspeaker unit 102, and is designed to emit sound of a low range. First loudspeaker unit 101 includes first cone 112, first voice coil body 113, base component 114, first magnetic circuit 118, holding component 160, and first damper 151.

First cone 112 is a membrane-like component that generates sound by vibrating due to reciprocating motion in the winding-axis direction of first voice coil body 113. Although first cone 112 is not limited to any particular shape (structure), in the present embodiment, first cone 112 is in the shape of a truncated cone (cone for which the apex region has been cut off). Furthermore, a bulging edge is provided in an annular shape on an outer-circumferential portion of first cone 112. A penetrating hole is provided in the center of first cone 112, to which first voice coil body 113 is attached through adhesion in such a manner that voice coil body 113 pierces through. The entirety of the outer-circumferential portion of first cone 112 is attached to base component 114 through adhesion.

First voice coil body 113 includes first voice coil 131 that generates a magnetic field in response to an input signal, and cylindrical first bobbin 132 on which first voice coil 131 is wound. First cone 112 is attached to the outer circumference of the distal end portion of first bobbin 132 of first voice coil body 113, and first voice coil 131 is disposed on the base end portion of first bobbin 132. First voice coil 131 is disposed in an inserted manner in an annular magnetic gap of first magnetic circuit 118.

Base component 114 is a component that serves as the structural base of loudspeaker 100. Although base component 114 is not limited to any particular shape, in the present embodiment, base component 114 includes container portion 141 that supports and houses first magnetic circuit 118, annular first annular portion 142 to which the outer circumference of first cone 112 is directly connected through adhesion, and columnar connecting portions 143 that connect container portion 141 and first annular portion 142. Multiple connecting portions 143 are disposed in a circular arrangement centered about the winding axis of first voice coil body 113.

Although base component 114 is not limited to any particular material, in the present embodiment, base component 114 is made of resin, and container portion 141, first annular portion 142, and connecting portions 143 are integrally formed.

First magnetic circuit 118 is a circuit that generates a constant magnetic field in the magnetic gap. Although first magnetic circuit 118 may be of an inner-magnet or outer-magnet type, in the present embodiment, first magnetic circuit 118 is of an inner-magnet type and includes bottomed, cylindrical first yoke 115, disc-shaped first magnet 116 housed in first yoke 115, and disc-shaped first top plate 117 that is attached to the end surface of first magnet 116 on the side opposite first yoke 115 and that forms the magnetic gap with first yoke 115.

Insertion hole 119 is provided in the center of first top plate 117. Protrusion 129, which is a portion of support component 124 (later described in detail), is inserted into insertion hole 119, thereby allowing support component 124 to be aligned with first magnetic circuit 118.

Holding component 160 includes second annular portion 162 which, together with first annular portion 142 of base component 114, sandwiches and holds in place the entirety of the outer-circumferential portion of first cone 112. Furthermore, holding component 160 includes third annular portion 163 which, together with the end surface of support component 124, which will later be described in detail, sandwiches and holds in place the entirety of the outer-circumferential portion of second cone 122. Second annular portion 162 is disposed concentrically outward from third annular portion 163, and second annular portion 162 and third annular portion 163 are connected by rod-shaped bridge portions 161 that are arranged radially.

In the present embodiment, second annular portion 162 is horn shaped, and adjusts the directivity of sound emitted from second loudspeaker unit 102.

First damper 151 is a component that connects base component 114 and first voice coil body 113, and supports the reciprocating motion in a cylinder-axis direction of first voice coil body 113. In the present embodiment, first damper 151 is a thin, annular component with wave-like curves, the inner circumference of which is attached to an intermediate portion of first voice coil body 113, and the outer-circumferential portion of which is attached to an intermediate portion of base component 114. It should be noted that there may be cases where first loudspeaker unit 101 does not include first damper 151.

Second loudspeaker unit 102 is a loudspeaker disposed on the sound-emitting side of first loudspeaker unit 101 (Z+ side in the figures), and emits sound in the same direction as first loudspeaker unit 101. Second loudspeaker unit 102 is a loudspeaker that is more compact than first loudspeaker unit 101, and is designed to emit sound of a higher range than first loudspeaker unit 101. Similar to first loudspeaker unit 101, second loudspeaker unit 102 includes second cone 122, second voice coil body 123, support component 124, and second magnetic circuit 128.

Second cone 122 is a membrane-like component that generates sound by vibrating due to reciprocating motion in the winding-axis direction of second voice coil body 123. Although second cone 122 is not limited to any particular shape (structure), in the present embodiment, second cone 122 is dome shaped. Furthermore, a bulging edge is provided in an annular shape on an outer-circumferential portion of second cone 122. The entirety of the outer-circumferential portion of second cone 122 is attached to an end surface of support component 124 through adhesion.

Second voice coil body 123 includes second voice coil 134 that generates a magnetic field in response to an input signal, and a cylindrical second bobbin 135 on which second voice coil 134 is wound. Second cone 122 is attached to the outer circumference of the distal end portion of second bobbin 135 of first voice coil body 113, and second voice coil 134 is disposed on the base end portion of second bobbin 135. Second voice coil 134 is disposed in an inserted manner in an annular magnetic gap of second magnetic circuit 128.

In the present embodiment, the winding axis of second voice coil 134 of second loudspeaker unit 102 is disposed on the same axis as the winding axis of first voice coil 131 of first loudspeaker unit 101, and second loudspeaker unit 102 is disposed in front of first cone 112 of first loudspeaker unit 101 (Z+ side in the figures) so as to emit sound in the same direction as first loudspeaker unit 101. That is to say, loudspeaker 100 is a so-called coaxial loudspeaker.

Figure 3:
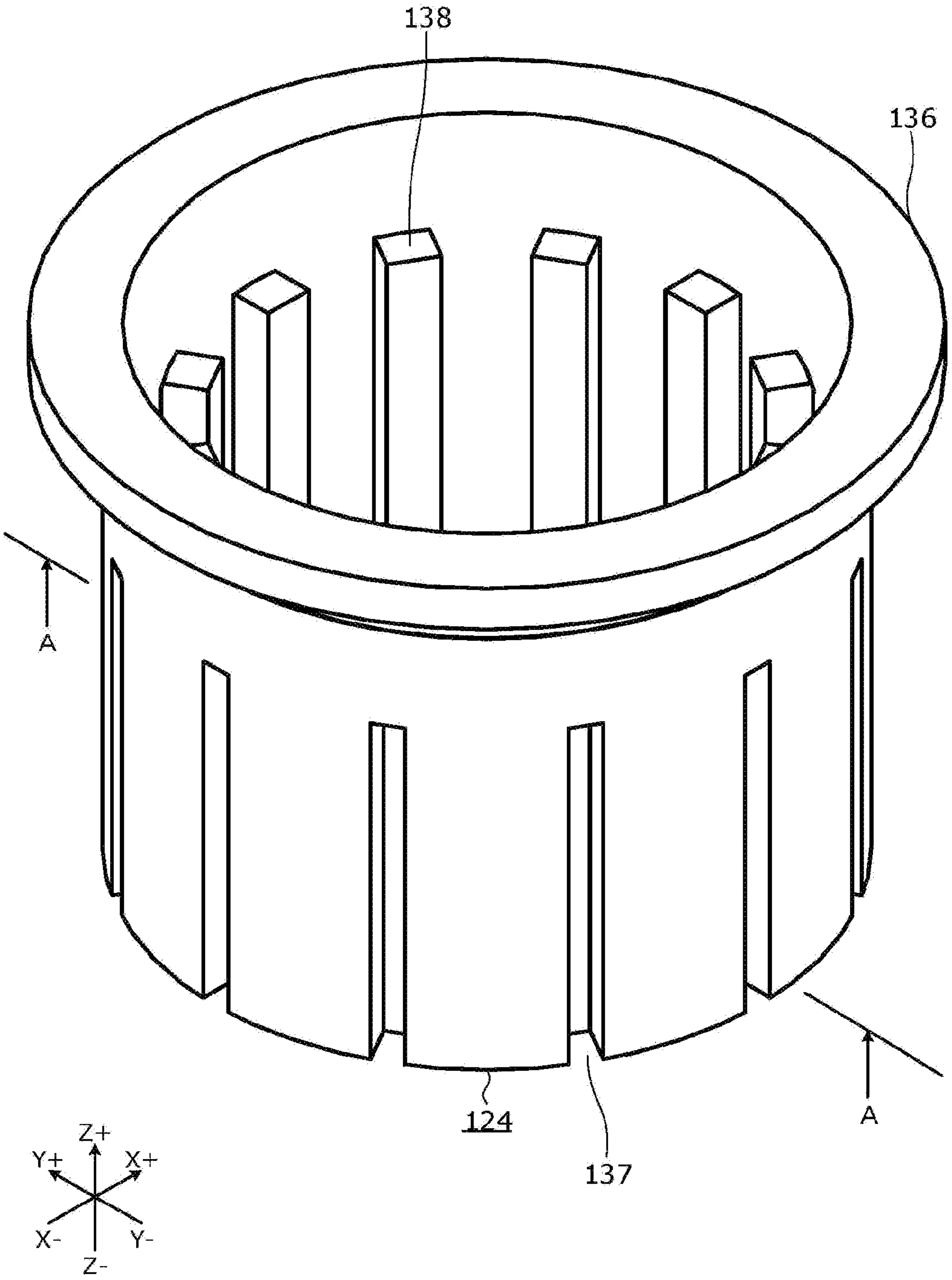
FIG. 3 is a perspective view of a support component according to the embodiment.
Figure 4:
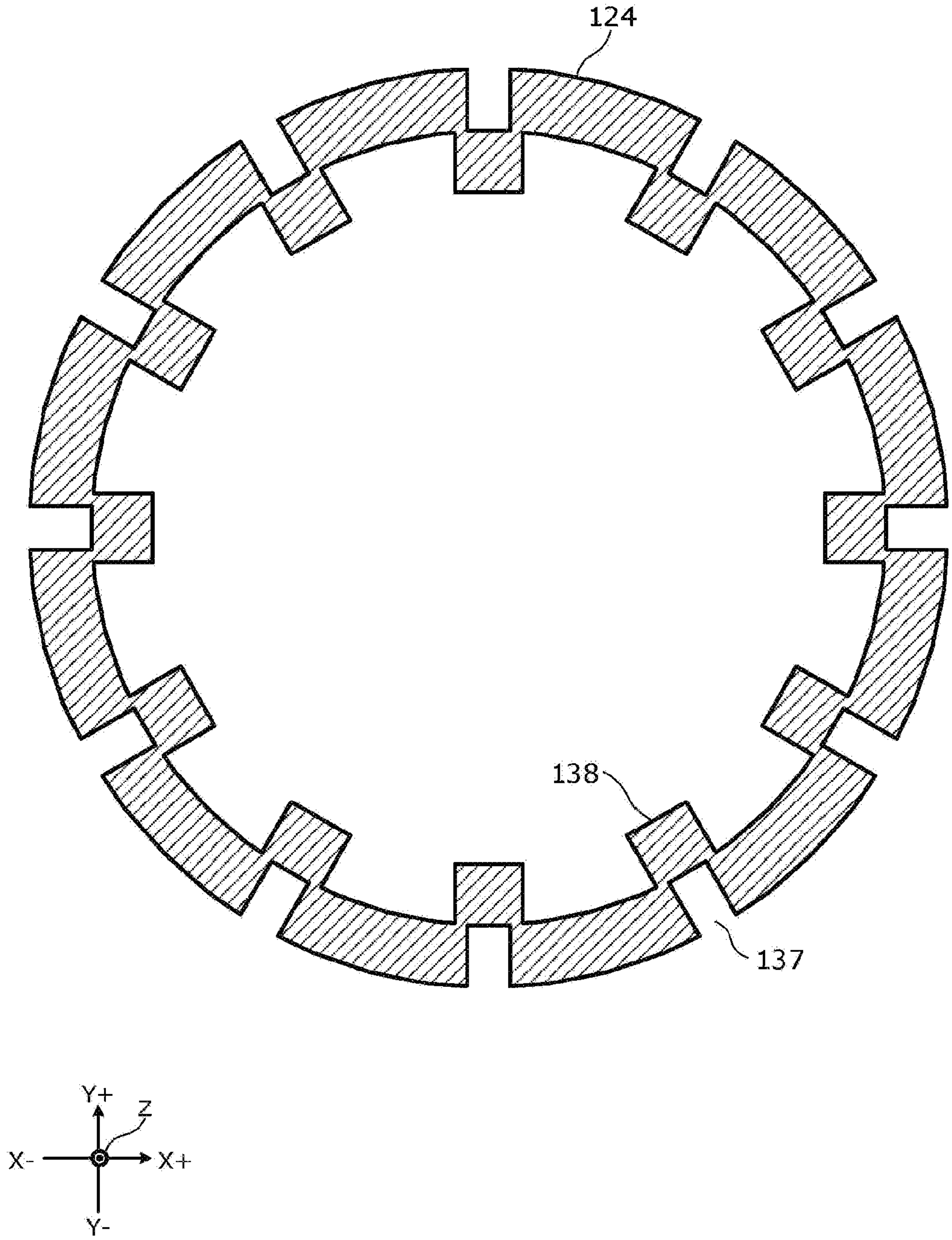
FIG. 4 is a cross-sectional view of the support component taken along line A-A in FIG. 3.

FIG. 3 is a perspective view of the support component. FIG. 4 is a cross-sectional view of the support component taken along line A-A in FIG. 3. Support component 124 is a cylindrical component, the bottom of which is fixed to first top plate 117 of first magnetic circuit 118. Support component 124, an end surface of which is connected to the entirety of the outer-circumferential portion of second cone 122, supports and houses second magnetic circuit 128. In the present embodiment, the support component supports second magnetic circuit 128 such that second magnetic circuit 128 is disposed inward of cone-shaped first cone 112 of first loudspeaker unit 101, that is, second magnetic circuit 128 is positioned behind the edge of first cone 112 in the front-back direction (Z-axis direction in the figures).

In the present embodiment, support component 124 is in the shape of a bottomed cylinder, and includes, at the central portion of its bottom, cylindrical protrusion 129 that protrudes outward. By inserting protrusion 129 into insertion hole 119 provided in first top plate 117 of first magnetic circuit 118, second loudspeaker unit 102 can be aligned with first loudspeaker unit 101. Flange 136 that protrudes outward is provided at the distal end portion of support component 124. Accordingly, the area of contact with the outer circumference of second cone 122 can be increased while minimizing the overall thickness of support component 124, thereby enabling both a reduction of the weight of support component 124 and enhancement of the adhesive strength between support component 124 and second cone 122.

The outer-circumferential surface of support component 124 is set to be parallel to the inner-circumferential surface of cylindrical first voice coil body 113. In other words, the space between support component 124 and first voice coil body 113 is set to be a uniform area from the opening corresponding to the distal end (Z+ side end in the figures) of first voice coil body 113 to the bottom of support component 124. Accordingly, resonance caused by the space between support component 124 and first voice coil body 113 can be suppressed, and degradation of the frequency response of loudspeaker 100 can be prevented.

Furthermore, support component 124 includes, at multiple locations, grooves 137 that are recessed inward from the outer-circumferential surface of support component 124, and that extend in a cylinder-axis direction of support component 124. Accordingly, the weight of support component 124 can be reduced, and furthermore, effective cooling can be performed for heat generated from first voice coil body 113. Although grooves 137 are not limited to any particular width, the width may be set such that resonance (Helmholtz resonance) can be suppressed.

Furthermore, as shown in FIG. 3 and FIG. 4, support component 124 includes, at locations corresponding to the multiple grooves 137, projecting portions 138 that protrude inward from the inner-circumferential surface behind grooves 137, and that extend in the cylinder-axis direction of support component 124. The top end surfaces (end surfaces facing Z+ side in the figures) of the multiple projecting portions 138 are disposed in the same plane, and second magnetic circuit 128 is supported by support component 124 while abutting each of the top end surfaces. By providing, behind grooves 137, projecting portions 138 that are wider than grooves 137, thickness of the circumferential wall of support component 124 can be minimized, thereby making it possible to reduce the weight of support component 124.

Second magnetic circuit 128 is a circuit that generates a constant magnetic field in a magnetic gap. Although second magnetic circuit 128 may be of an inner-magnet or outer-magnet type, in the present embodiment, similar to first magnetic circuit 118, second magnetic circuit 128 is of an inner-magnet type and includes bottomed, cylindrical second yoke 125, disc-shaped second magnet 126 housed in second yoke 125, and disc-shaped second top plate 127 that is attached to the end surface of second magnet 126 on the side opposite second yoke 125 and that forms the magnetic gap with second yoke 125.

It should be noted that second magnetic circuit 128 and first magnetic circuit 118 may be of different types, such as a case where second magnetic circuit 128 is of an outer-magnet type and first magnetic circuit 118 is of an inner-magnet type.

As described above, in loudspeaker 100 according to the present embodiment, since a single support component 124 functions as the frame of second loudspeaker unit 102, and functions as a component for positioning second loudspeaker unit 102 at a predetermined position in relation to first loudspeaker unit 101, the number of components included in loudspeaker 100 can be reduced and a weight reduction can be achieved. Furthermore, as the structural strength of loudspeaker 100 is increased due to structural simplification, it is possible to realize a loudspeaker 100 that is resistant to vibration, impact, and the like.

Additionally, toward the front of loudspeaker 100 (Z+ side in the figures), holding component 160 connects base component 114 and support component 124 in a bridge-like manner, and toward the rear of loudspeaker 100 (Z− side in the figures), support component 124 is fixed to base component 114 via first magnetic circuit 118. With this structure, the structural strength of loudspeaker 100 can be further increased.

It should be noted that the present disclosure is not limited to the above embodiment. For example, other embodiments realized by arbitrarily combining or omitting some elements described in the present Specification may be included as embodiments of the present disclosure. Moreover, the present disclosure includes variations obtained by various modifications to the above embodiment that can be conceived by those skilled in the art, so long as they do not depart from the essence of the present disclosure, that is, the intended meaning of the appended Claims.

For example, loudspeaker 100 may include a physical equalizer, such as a resonator in front of second cone 122 of second loudspeaker unit 102.

Additionally, loudspeaker 100 may include a stand-alone cabinet, and may be attached to the housing of an electronic device, such as a television or computer, or the structure of a mobile body, such as an automobile or aircraft.

Further Information about Technical Background to this Application

The disclosures of the following patent applications including specification, drawings, and claims are incorporated herein by reference in their entirety: Japanese Patent Application No. 2021-046585 filed on Mar. 19, 2021, and PCT International Application No. PCT/JP2022/003395 filed on Jan. 28, 2022.

INDUSTRIAL APPLICABILITY

The present disclosure can be applied to a loudspeaker that reproduces audio signals of music and the like.

The invention claimed is:

1. A loudspeaker comprising:

a first loudspeaker unit that includes a first magnetic circuit and a first cone; and a second loudspeaker unit that is disposed on a sound-emitting side of the first loudspeaker unit, and includes a second magnetic circuit and a second cone, wherein the second loudspeaker unit includes a support component that is fixed to the first magnetic circuit and supports therein the second magnetic circuit, the support component being approximately cylindrical and including an end surface to which an entirety of an outer-circumferential portion of the second cone is connected, a plurality of grooves are recessed inward from an outer-circumferential surface of the support component, each of the plurality of grooves extending in a cylinder-axis direction of the support component, a plurality of projecting portions are provided to correspond to the plurality of grooves, each of the plurality of projecting portions projecting inward from an inner-circumferential surface of the support component and extending in the cylinder-axis direction, each of the plurality of projecting portions is located behind a corresponding one of the plurality of grooves, the second magnetic circuit is supported by the support component by abutting an end surface of each of the plurality of projecting portions, each of the plurality of projecting portions has three sides, wherein two sides of the three sides of each of the plurality of projecting portions extend inward from the inner-circumferential surface of the support component, and another one of the three sides of each of the plurality of projecting portions connects between inner ends of the two sides, each of the plurality of grooves has three sides, wherein two sides of the three sides of each of the plurality of grooves extend inward from the outer-circumferential surface of the support component, and another one of the three sides of each of the plurality of grooves connects between inner ends of the two sides, an opening side of each of the plurality of projecting portions faces a corresponding one of the plurality of grooves, a width of each of the plurality of projecting portions is greater than a width of each of the plurality of grooves, and a depth of each of the plurality of grooves is equal to a thickness of the support component.

2. The loudspeaker according to claim 1, wherein the first loudspeaker unit includes a first voice coil body, the second loudspeaker unit includes a second voice coil body, and a surface of the support component and a surface of the first voice coil body that face each other are parallel to each other.

3. The loudspeaker according to claim 1, further comprising:

a base component that supports the first magnetic circuit and to which the first cone is directly connected; and a holding component that sandwiches the first cone with the base component and sandwiches the second cone with the support component.

4. The loudspeaker according to claim 1, wherein the width of each of the plurality of grooves is smaller than a depth of each of the plurality of grooves.

5. The loud speaker according to claim 3, wherein the base component includes a first annular portion to which an outer-circumference of the first cone is directly connected, and the holding component includes:

a second annular portion which, together with the first annular portion of the base component, sandwiches and holds in place the entirety of the outer-circumferential portion of the first cone, a third annular portion which, together with the end surface of the support component, sandwiches and holds in place the entirety of the outer-circumferential portion of the second cone, and rod-shaped bridge portions that extend radially and connect between the second annular portion and the third annular portion.

6. The loud speaker according to claim 5, wherein the third annular portion is horn shaped, and adjusts a directivity of sound emitted from the second loudspeaker unit.

7. The loud speaker according to claim 3, wherein the support component has a bottom, an outer surface of which is supported by the first magnetic circuit, and an inner diameter of the support component is constant from a position of an inner surface of the bottom of the support component to a position of a lower surface of the second magnetic circuit accommodated in the support component, the lower surface abutting the end surface of each of the plurality of projecting portions.

* * * * *